(12) United States Patent
Berte' et al.

(10) Patent No.: US 7,713,444 B2
(45) Date of Patent: May 11, 2010

(54) MIXTURES OF STERICALLY HINDERED AMINES FOR THE STABILISATION OF POLYMERS

(75) Inventors: Ferruccio Berte', Bergamo (IT); Claudio Malanchini, Bergamo (IT)

(73) Assignee: 3V Sigma S.p.A., Milan (IT)

( * ) Notice: Subject to any disclaimer, the term of this patent is extended or adjusted under 35 U.S.C. 154(b) by 0 days.

(21) Appl. No.: 12/138,777

(22) Filed: Jun. 13, 2008

(65) Prior Publication Data

US 2009/0270535 A1 Oct. 29, 2009

(30) Foreign Application Priority Data

Apr. 24, 2008 (IT) .............................. MI2008A747

(51) Int. Cl.
*C09K 15/16* (2006.01)
*C09K 15/04* (2006.01)
*C08K 5/34* (2006.01)

(52) U.S. Cl. .................... 252/405; 252/399; 524/99; 524/100; 524/102; 524/105

(58) Field of Classification Search ............ 252/399, 252/405; 524/99, 100, 102, 105
See application file for complete search history.

(56) References Cited

U.S. PATENT DOCUMENTS

| | | | |
|---|---|---|---|
| 3,640,928 A | 2/1972 | Murayama et al. | |
| 3,993,655 A | 11/1976 | Rasberger et al. | |
| 4,038,280 A | 7/1977 | Randell et al. | |
| 4,086,204 A | 4/1978 | Cassandrini et al. | |
| 4,104,248 A | 8/1978 | Cantatore | |
| 4,233,412 A | 11/1980 | Rody et al. | |
| 4,315,859 A | 2/1982 | Nikles | |
| 4,325,863 A | 4/1982 | Hinsken et al. | |
| 4,331,586 A | 5/1982 | Hardy | |
| 4,338,244 A | 7/1982 | Hinsken et al. | |
| 4,477,615 A | 10/1984 | Raspanti et al. | |
| 4,530,950 A | 7/1985 | Raspanti et al. | |
| 4,692,486 A | 9/1987 | Gugumus | |
| 4,863,981 A | 9/1989 | Gugumus | |
| 5,021,485 A | 6/1991 | Gugumus | |
| 5,175,312 A | 12/1992 | Dubs | |
| 5,216,052 A | 6/1993 | Nesvadba et al. | |
| 5,252,643 A | 10/1993 | Nesvadba | |
| 5,430,950 A | 7/1995 | Beckwith, Jr. et al. | |
| 5,658,973 A * | 8/1997 | Raspanti ................. | 524/99 |

FOREIGN PATENT DOCUMENTS

| | | |
|---|---|---|
| DE | 1 929 928 | 1/1970 |
| DE | 1929828 A1 | 12/1970 |
| DE | 24 56 864 | 6/1975 |
| DE | 2456864 A1 | 6/1975 |
| DE | 43 16 611 A1 | 11/1993 |
| DE | 43 16 622 A1 | 11/1993 |
| DE | 43 16 876 A1 | 11/1993 |
| DE | 4316611 A1 | 11/1993 |
| DE | 4316622 A1 | 11/1993 |
| DE | 4316876 A1 | 11/1993 |
| EP | 0252877 A1 | 1/1988 |
| EP | 0 589 839 B1 | 3/1994 |
| EP | 0589839 A1 | 3/1994 |
| EP | 0591102 A1 | 4/1994 |
| EP | 0 709 426 82 | 5/1996 |
| EP | 0709426 A2 | 5/1996 |
| EP | 0 728 806 B2 | 8/1996 |
| EP | 0728806 A1 | 8/1996 |
| EP | 1780237 A2 | 5/2007 |
| GB | 2120248 A | 11/1983 |

\* cited by examiner

*Primary Examiner*—Lorna M Douyon
*Assistant Examiner*—Tanisha Diggs
(74) *Attorney, Agent, or Firm*—Arent Fox LLP

(57) ABSTRACT

This invention relates to mixtures of new polypiperidine compounds of general formula (I) with other known polypiperidine compounds which impart to polymer materials of different kinds, in particular polyolefins, high stability towards oxidative action and photodegradation.

13 Claims, No Drawings

MIXTURES OF STERICALLY HINDERED AMINES FOR THE STABILISATION OF POLYMERS

The present invention relates to mixtures of novel polypiperidine compounds of general formula (I) with other known polypiperidine compounds which give different kinds of polymer materials, in particular polyolefins, high stability towards oxidative action and photodegradation.

INTRODUCTION

Polymers are known to be subject to deterioration caused by heat, light and oxygen; these factors cause loss of their mechanical properties, discolouring and other adverse effects.

In order to stabilise polymer materials, mainly towards the UV radiation in sunlight, various classes of compounds have been proposed, such as benzophenones and benzotriazoles. The stability which these compounds give polymers is acceptable, but insufficient to meet current practical needs, especially in the case of fibres, films and raffia based on olefin polymers.

The polyalkylpiperidine derivatives commonly called HALS (hindered amine light stabilisers) are far more effective, and there are numerous patents relating to them. See, for example, U.S. Pat. No. 4,530,950, DE 1,929,928, U.S. Pat. No. 3,640,928, U.S. Pat. No. 4,477,615, U.S. Pat. No. 4,233,412, U.S. Pat. No. 4,331,586, DOS 2,636,144, DE 2,456,864, U.S. Pat. No. 4,315,859, U.S. Pat. No. 4,104,248, U.S. Pat. No. 4,086,204 and U.S. Pat. No. 4,038,280.

Synergic effects are also claimed for mixtures of HALS, e.g. in U.S. Pat. No. 4,692,486, U.S. Pat. No. 4,863,981, U.S. Pat. No. 5,021,485, EP 0 709 426 and EP 0 728 806.

It has now been discovered that mixtures of low molecular weight HALS, generally described as monomeric HALS, and high molecular weight HALS, generally described as polymeric or macromolecular HALS, including 10% to 90% of mixtures of oligomers of general formula (I) disclosed in pending Italian application n. MI2008A739, are particularly effective.

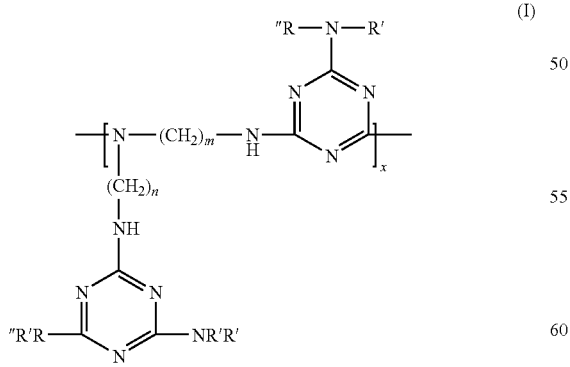

wherein the indexes "m" and "n" have different values, with random distribution, within the same macromolecule and at least one of the compounds has the formula A, B, C, D, E or F, wherein:

A means:

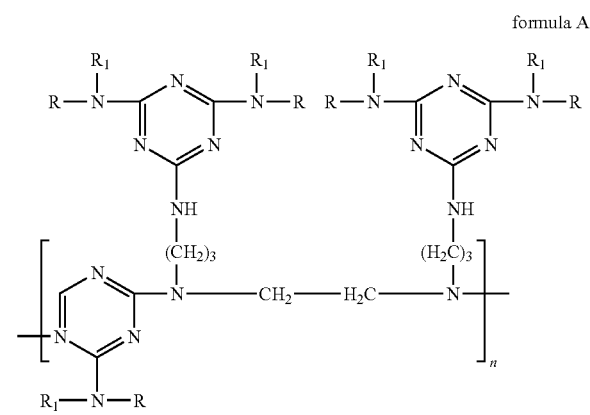

formula A

In formula A

R means:

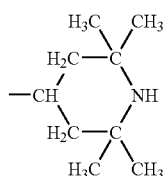

or:

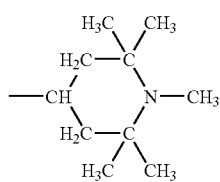

$R_1$ means H or straight or branched C1-C4 alkyl n takes values from 2 to 10

B means:

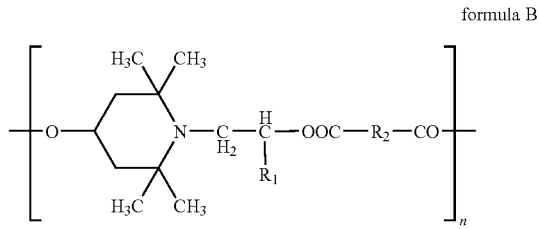

formula B

In formula B $R_1$ is hydrogen or methyl $R_2$ is a direct bond or the $C_1$-$C_{10}$ alkylene group n is a number between 2 and 50

C means:

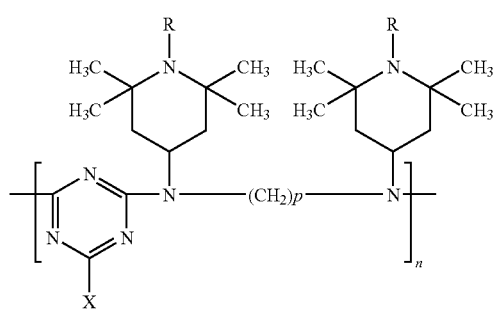
Formula C

In formula C
n is a number between 2 and 50
p is a number between 2 and 10
R means H or methyl
and X may have the meanings of formulas VII, VIII or IX:

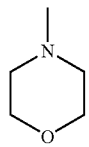
Formula VII

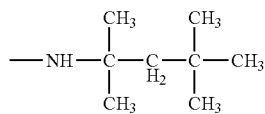
Formula VIII

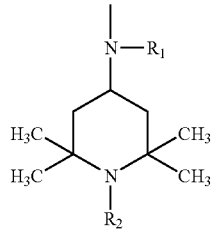
Formula IX wherein $R_1$ is a straight or branched C1-C4 alkyl group and $R_2$ is H or methyl.

D means:

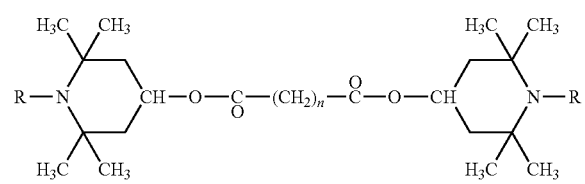
Formula D in formula D
n is a number between 2 and 10
R is H or methyl E means:

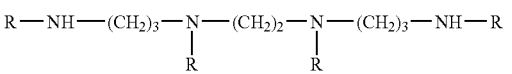
Formula E

In formula E:
R represents the residue

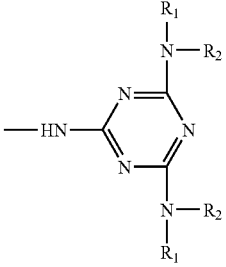

wherein $R_1$ and $R_2$ are independently H, a straight or branched C1-C4 alkyl group, or the group of formula (V).

F means:

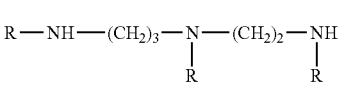
Formula F wherein the symbol R has the same meanings as for the compounds of Formula E.

The products of formula (I) can be obtained by a process which involves reacting an amine of general formula (II)

$$NH_2-(CH_2)_m-NH-(CH_2)_n-NH_2 \qquad (II)$$

with a derivative of formula (III)

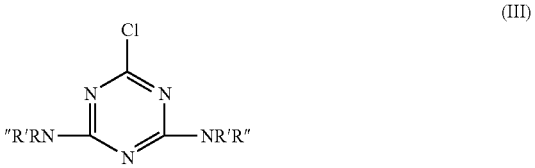
(III)

and then, having obtained the intermediate, consisting of a mixture of compounds of general formula (VI) and (VI)'

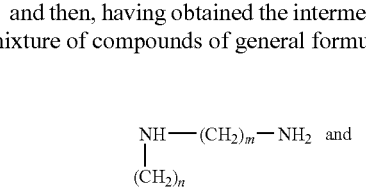
(VI)

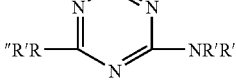

-continued

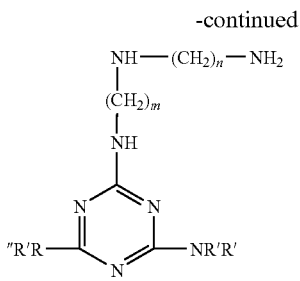

with the compounds of formula (IV):

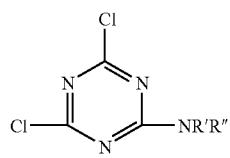

where R' and R", which are the same or different, are H or straight or branched C2-C8 alkyl groups, preferably C$_4$, or group (V)

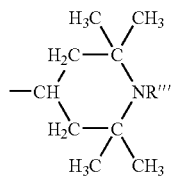

with R'''=H or straight or branched C1-C4 alkyl group m, n, which are the same or different, can have values from 2 to 8, preferably from 2 to 3, and differ from one another in each amine of formula (II).

The compounds of formula A, B, C, D, E and F and their preparations are known. See, for example, U.S. Pat. No. 4,477,615; U.S. Pat. No. 3,840,494; U.S. Pat. No. 3,640,928; U.S. Pat. No. 4,331,586; EP 93693; U.S. Pat. No. 4,263,434; JP 570 38 589; U.S. Pat. No. 6,046,304.

An example of a compound of formula A is the product commercially known under the name Uvasorb HA88 (CAS RN=136504-96-6).

An example of a compound of formula B is the product commercially known under the name Uvasorb HA22 (CAS RN=65447-77-0).

An example of a compound of formula C with X=residue of formula VII is the product commercially known under the name Cyasorb UV-3346 (CAS RN=82451-48-7).

An example of a compound of formula C with X=residue of formula VIII is the product commercially known under the name Chimassorb 944 (CAS RN=71878-19-8).

An example of a compound of formula C with X=residue of formula IX is the product commercially known under the name Chimassorb 2020 (CAS RN=192268-64-7).

An example of a compound of formula D with R=H and n=8 is the product commercially known under the name Uvasorb HA77 (CAS RN=52829-07-9);

An example of a compound of formula D with R=methyl and n=8 is the product commercially known under the name Uvasorb HA29 (CAS RN=41556-26-7);

An example of a compound of formula E with R$_2$=n-butyl and R$_1$=residue of formula (V) having R'''=methyl is the product commercially known under the name Chimassorb 119 (CAS RN=106990-43-6).

The mixtures of the invention can be obtained in any known way, for example (a) by melting the compounds of formula (I) together with the compounds of formula A, B, C, D, E, F and subsequently grinding or granulating the resulting mixture, (b) dissolving the components in an usual solvent and evaporating to dryness the solution, (c) incorporating the compounds separately in the polymer substrate to be stabilised, thus obtaining the mixture "in situ" or, if possible, (d) mixing specific starting materials in the same chemical syntheses of the compounds, for example by mixing suitable polyamines in the processes described in U.S. Pat. No. 4,477,615.

The invention also relates to the use of mixtures of the compounds of formula (I) with at least one of the compounds of formula A, B, C, D, E and F as stabilisers for polymers, in particular for polyolefin polymers.

According to the invention polymers comprise polyethylene, polypropylene, polystyrene, polybutadiene, polyisoprene and their copolymers, polyvinyl chloride, polivinylidene chloride and their copolymers, polyvinyl acetate and its copolymers, in particular with ethylene; polyesters such as polyethylene terephthalate; polyamides such as Nylon 6 and 6.6; and polyurethanes.

The mixtures of the invention can be incorporated in polymers by any known method for mixing additives and polymer materials; for example by:

mixing with the polymer, which can be in the form of powder or granulate, in a suitable mixer;

addition in the form of a solution or suspension in a suitable solvent, and subsequent removal of the solvent from the polymer, which may be in the form of a powder, granulate or suspension, after thorough mixing;

addition to the polymer during its preparation, for example during the last stage of preparation.

The mixtures of the invention can be added together with other types of stabilisers and additives generally used in the art, such as antioxidants based on phenols, amines or phosphites; UV radiation absorbers based on benzophenones or benzotriazoles; nickel-based stabilisers; plasticisers, lubricants, antistatic agents, flame retardants, corrosion inhibitors, metal deactivators and mineral fillers such as titanium dioxide, aluminium oxide and the like.

Examples of said additives are:

1. Antioxidants 1.1. Alkylated phenols, e.g. 2,6-di-tert-butyl-4-methylphenol; 2-tert-butyl-4,6-dimethyl phenol; 2,6-di-tert-butyl-4-ethyl-phenol; 2,6-di-tert-butyl-4-n-butylphenol; 2,6-di-tert-butyl-4-isobutylphenol; 2,6-dicyclopentyl-4-methylphenol; 2-(α-methyl-cyclohexyl)-4,6-dimethyl-phenol; 2,6-dioctadecyl-4-methylphenol; 2,4,6-tricyclohexyl-phenol; 2,6-di-tert-butyl-4-methoxy-methylphenol; nonyl-phenols which are linear or branched in the side chains, for example, 2,6-di-nonyl-4-methylphenol; 2,4-dimethyl-6-(1-methylundecyl)-phenol; 2,4-dimethyl-6-(1'-heptadecyl)phenol; and mixtures thereof.

1.2. Alkylthiomethylphenols, e.g. 2,4-dioctylthiomethyl-6-tert-butylphenol; 2,4-dioctylthiomethyl-6-methylphenol; 2,4-dioctylthiomethyl-6-ethylphenol; 2,6-di-dodecylthiomethyl-4-nonylphenol.

1.3. Hydroquinones and alkylated hydroquinones, e.g. 2,6-di-tert-butyl-4-methoxyphenol; 2,5-di-tert-butylhydroquinone; 2,5-di-tert-amyl-hydroquinone; 2,6-diphenyl-4-octadecyloxyphenol; 2,6-di-tert-butyl-hydroquinone; 2,5-di-tert-butyl-4-hydroxyanisole; 3,5-di-tert-butyl-4-hydroxyanisole; 3,5-di-tert-butyl-4-hydroxyphenyl stearate; bis-(3,5-di-tert-butyl-4-hydroxyphenyl) adipate.

1.4. Tocopherols, e.g. α-tocopherol, β-tocopherol, -γ-tocopherol, δ-tocopherol and mixtures thereof (Vitamin E).

1.5. Hydroxylated thiodiphenyl ethers, e.g. 2,2'-thiobis-(6-tert-butyl-4-methylphenol); 2,2'-thiobis(4-octyl phenol); 4,4'-thiobis-(6-tert-butyl-3-methyl-phenol); 4,4'-thiobis-(6-tert-butyl-2-methyl phenol); 4,4'-bis-(2,6-dimethyl-4-hydroxyphenyl)disulfide.

1.6. Alkylidenebisphenols, e.g. 2,2'-methylenebis(6-tert-butyl-4-methylphenol); 2,2'-methylenebis(6-tert-butyl-4-ethylphenol); 2,2'-methylene-bis[4-methyl-6-(α-methylcyclohexyl)-phenol]; 2,2'-methylene-bis-(4-methyl-6-cyclohexylphenol); 2,2'-methylenebis(6-nonyl-4-methylphenol); 2,2'-methylenebis-(4,6-di-tert-butylphenol); 2,2'-ethylidenebis-(4,6-di-tert-butyl-phenol); 2,2'-ethylidenebis-(6-tert-butyl-4-isobutylphenol); 2,2'-methylenebis[6-(α-methylbenzyl)-4-nonyl-phenol]; 2,2'-methylenebis[6-(α,α-dimethyl-benzyl)-4-nonyl-phenol]; 4,4'-methylenebis(2,6-di-tert-butylphenol); 4,4'-methylene-bis-(6-tert-butyl-2-methylphenol); 1,1-bis(5-tert-butyl-4-hydroxy-2-methyl-phenyl)-butane; 2,6-bis(3-tert-butyl-5-methyl-2-hydroxybenzyl)-4-methylphenol; 1,1,3-tris(5-tert-butyl-4-hydroxy-2-methylphenyl)-butane; 1,1-bis(5-tert-butyl-4-hydroxy-2-methyl-phenyl)-3-n-dodecyl-mercaptobutane; ethylene glycol bis[3,3-bis(3'-tert-butyl-4'-hydroxyphenyl)butyrate]; bis(3-tert-butyl-4-hydroxy-5-methyl-phenyl)-dicyclopentadiene; bis-[2-(3'-tert-butyl-2'-hydroxy-5'-methylbenzyl)-6-tert-butyl-4-methylphenyl] terephthalate; 1,1-bis-(3,5-dimethyl-2-hydroxyphenyl) butane; 2,2-bis-(3,5-di-tert-butyl-4-hydroxy-phenyl) propane; 2,2-bis-(5-tert-butyl-4-hydroxy-2-methylphenyl)-4-n-dodecyl-mercaptobutane; 1,1,5,5-tetra-(5-tert-butyl-4-hydroxy-2-methyl-phenyl)-pentane.

1.7. O-, N- and S-benzyl compounds, e.g. 3,5,3',5'-tetra-tert-butyl-4,4'-dihydroxy-di-benzyl ether, octadecyl-4-hydroxy-3,5-dimethylbenzyl-mercaptoacetate, tridecyl-4-hydroxy-3,5-di-tert-butyl-benzylmercaptoacetate, tris(3,5-di-tert-butyl-4-hydroxybenzyl)amine, bis(4-tert-butyl-3-hydroxy-2,6-dimethylbenzyl)dithioterephthalate, bis-(3,5-di-tert-butyl-4-hydroxy-benzyl)-disulfide, isooctyl-3,5-di-tert-butyl-4-hydroxybenzylmercaptoacetate.

1.8. Hydroxybenzylated malonates, e.g. dioctadecyl-2,2-bis-(3,5-di-tert-butyl-2-hydroxybenzyl)-malonate, di-octadecyl-2-(3-tert-butyl-4-hydroxy-5-methylbenzyl)-malonate, didodecylmercaptoethyl-2,2-bis-(3,5-di-tert-butyl-4-hydroxybenzyl)-malonate, bis-[4-(1,1,3,3-tetramethylbutyl)phenyl]-2,2-bis(3,5-di-tert-butyl-4-hydroxybenzyl)-malonate.

1.9. Aromatic hydroxybenzyl compounds, e.g. 1,3,5-tris-(3,5-di-tert-butyl-4-hydroxy-benzyl)-2,4,6-trimethylbenzene, 1,4-bis(3,5-di-tert-butyl-4-hydroxybenzyl)-2,3,5,6-tetramethylbenzene, 2,4,6-tris-(3,5-di-tertbutyl-4-hydroxybenzyl)phenol.

1.10. Triazine compounds, e.g. 2,4-bis-(octylmercapto)-6-(3,5-di-tert-butyl-4-hydroxyanilino)-1,3,5-triazine, 2-octylmercapto-4,6-bis-(3,5-di-tert-butyl-4-hydroxyanilino)-1,3,5-triazine, 2-octyl-mercapto-4,6-bis-(3,5-di-tert-butyl-4-hydroxyphenoxy)-1,3,5-triazine, 2,4,6-tris-(3,5-di-tert-butyl-4-hydroxy-phenoxy)-1,2,3-triazine, 1,3,5-tris-(3,5-di-tert-butyl-4-hydroxy-benzyl)isocyanurate, 1,3,5-tris(4-tert-butyl-3-hydroxy-2,6-dimethylbenzyl)-isocyanurate, 2,4,6-tris-(3,5-di-tert-butyl-4-hydroxy-phenylethyl)-1,3,5-triazine, 1,3,5-tris-(3,5-di-tert-butyl-4hydroxy-phenylpropionyl)-hexahydro-1,3,5-triazine, 1,3,5-tris-(3,5-dicyclohexyl-4-hydroxybenzyl)isocyanurate.

1.11. Benzylphosphonates, e.g. dimethyl-2,5-di-tert-butyl-4-hydroxybenzylphosphonate, diethyl-3,5-di-tert-butyl-4-hydroxy-benzyl-phosphonate, dioctadecyl-3,5-di-tert-butyl-4-hydroxybenzyl-phosphonate, dioctadecyl-5-tert-butyl-4-hydroxy-3-methylbenzyl-phosphonate, the calcium salt of the monoethyl ester of 3,5-di-tert-butyl-4-hydroxybenzylphosphonic acid.

1.12. Acylaminophenols, e.g. 4-hydroxylauranilide, 4-hydroxy-stearanilide, octyl-N-(3,5-di-tert-butyl-4-hydroxyphenyl)-carbamate.

1.13. Esters of β-(3,5-di-tert-butyl-4-hydroxyphenyl)propionic acid with mono- or polyhydric alcohols, e.g. with methanol, ethanol, n-octanol, iso-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)-propionic acid with mono- or polyhydric alcohols, e.g. with methanol, ethanol, n-octanol, iso-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris-(hydroxyethyl)isocyanurate, N,N'-bis-(hydroxyl-ethyl)oxamide, 3-thiaundecanol, 3-thiapentadecanol, trimethyl-hexanediol, trimethylolpropane, 4-hydroxymethyl-1-phospha-2,6,7-trioxabicyclo[2.2.2]octane.

1.15. Esters of β-(3-,5-dicyclohexyl-4-hydroxyphenyl)propionic acid with mono- or polyhydric alcohols, e.g. with methanol, ethanol, n-octanol, iso-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethano, n-octanol, iso-octanol, octadecanol, 1,6-hexanediol, 1,9-nonanediol, ethylene glycol, 1,2-propanediol, neopentyl glycol, thiodiethylene glycol, diethylene glycol, triethylene gliycol, pentaerythritol, tris(hydroxyethyl)isocyanurate, N,N'-bis(hydroxyethyl)-oxamide, 3-thiaundecanol, 3-thiapentadecanol, trimethylhexanediol, trimethylolpropane, 4-hydroxymethyl-1-phospha-2,6,7-trioxabicyclo[2.2.2]-octane.

1.17. Amides of β-(3,5-di-tert-butyl-4-hydroxyphenyl) propionic acid e.g. N,N'-bis-(3,5-di-tert-butyl-4-hydroxyphenylpropionyl)-hexamethylene-diamide, N,N'-bis-(3,5-di-tert-butyl-4-hydroxy-phenyl-propionyl)trimethylene-diamide, N,N'-bis-(3,5-di-tert-butyl-4-hydroxyphenylpropionyl)hydrazide, N,N'-bis(2-(3-[3,5-di-tert-butyl-4-hydroxy-phenyl]propionyloxy)ethyl]oxamide.

1.18. Ascorbic acid (vitamin C)

1.19. Aminic antioxidants, e.g. N,N'-di-isopropyl-p-phenylene-diamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylene-diamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)-diphenylamine, N,N'-dimethyl-N,N'-di-sec-butyl-p-phenylenediamine, diphenylamine, N-allyldiphenylamine, 4-isopropoxy-diphenylamine, N-phenyl-1-naphthylamine, N-(4-tert-octylphenyl)-1-naphthylamine, N-phenyl-2-naphthylamine, p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis-(4-methoxy-phenyl)-amine, 2,6-di-tert-butyl-4-dimethylamino-methyl-phenol, 2,4'-damino-diphenylmethane, 4,4-diamino-diphenyl-methane, N,N,N',N'-tetramethyl-4,4'-diaminodiphenylmethane, 1,2-bis[(2-methylphenyl)-amino]ethane, 1,2-bis(phenylamino)propane, (o-tolyl)biguanide, bis[4-(1',3'-dimethylbutyl)-phenyl]amine, tertoctylated N-phenyl-1-naphthylamine, a mixture of dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazin, N,N,N',N'-tetraphenyl-1,4-diaminobut-2-ene, N,N-bis-(2,2,6,6-tetramethyl-piperid-4-yl-hexa-methylenediamine, bis-(2,2,6,6-tetramethylpiperid-4-yl)sebacate, 2,2,6,6-tetramethylpiperidin-4-one, 2,2,6,6-tetramethyl piperidin-4-ol.

2. UV Absorbers and Light Stabilisers 2.1. 2-(2.'-Hydroxyphenyl)benzotriazoles, e.g. 2-(2'-hydroxy-5'-methylphenyl)-benzo-triazole, 2-(3',5'-di-tert-butyl-2'-hydroxyphenyl)-benzotriazole, 2-(5'-tert-butyl-2'-hydroxyphenyl)benzotriazole, 2-(2'-hydroxy-5'-(1,1,3,3-tetramethylbutyl)phenyl)-benzo-triazole, 2-(3',5'-di-tert-butyl-2'-hydroxyphenyl)-5-chloro-benzotriazole, 2-(3'-tert-butyl-2'-hydroxy-5'-methyl-phenyl)-5-chloro-benzotriazole, 2-(3'-sec-butyl-5'-tert-butyl-2'-hydroxy-phenyl)-benzo-triazole, 2-(2'-hydroxy-4'-octyloxy-phenyl)benzotriazole, 2-(3',5'-di-tert-amyl-2'-hydroxyphenyl)-benzo-triazole, 2-(3',5'-bis-($\alpha,\alpha$-dimethyl-benzyl)-2'-hydroxy-phenyl)-benzotriazole, 2-(3'-tert-butyl-2-hydroxy-5'-(2-octyloxycarbonyl-ethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonyl)-ethyl)phenyl)-5-chloro-benzotriazole, 2-(3'-tert-butyl-2'-hydroxy 5'-(2-methoxycarbonyl-ethyl)phenyl benzotriazole, 2-(3'-tert-butyl-2'-hydroxy-5'-(2-octyloxy-carbonyl-ethyl)-phenyl) benzotriazole, 2-(3'-tert-butyl-5'-[2-(2-ethyl-hexyloxy)carbonylethyl]-2'-hydroxy-phenyl)-benzotriazole, 2-(3'-dodecyl-2'-hydroxy-5'-methylphenyl)-benzotriazole, 2-(3'-tert-butyl-2'-hydroxy-5'-(2-iso-octyloxy-carbonyl-ethyl)-phenyl-benzotriazole, 2,2'-methylene-bis[4-(1,1,3,3-tetramethylbutyl)-6-benzo-triazole-2-yl-phenol]; the transesterification product of 2-[3'-tert-butyl-5'-(2-methoxy-carbonylethyl)-2'-hydroxyphenyl]-2H-benzotriazole with polyethylene glycol 300; [R—CH2CH2-COO—CH2CH2-]2- where R=3'tert-butyl-4'-hydroxy-5'-2H-benzotriazol-2-yl-phenyl, 2-[2'-hydroxy-3'-($\alpha,\alpha$-dimethyl-benzyl)-5'-(1,1,3,3-tetramethyl-butyl)-phenyl]benzo-triazole; 2-[2'-hydroxy-3'-(1,1,3,3-tetramethyl-butyl)-5'-($\alpha,\alpha$-dimethyl-benzyl)-phenyl]-benzotriazole.

2.2. 2-Hydroxybenzophenones, e.g. the 4-hydroxy, 4-methoxy, 4-octyloxy, 4-decyloxy, 4-dodecyloxy, 4-benzyloxy, 4,2,4'-trihydroxy and 2-hydroxy-4,4'-dimethoxy derivatives.

2.3. Esters of substituted and unsubstituted benzoic acids, e.g. 4-tert-butyl-phenyl salicylate, phenyl salicylate, octylphenyl salicylate, dibenzoyl resorcinol, bis(4-tert-butyl-benzoyl)resorcinol, benzoyl resorcinol, 2,4-di-tert-butylphenyl 3,5-di-tert-butyl-4-hydroxy-benzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, e.g. ethyl($\alpha$-cyano-$\beta,\beta$-diphenylacrylate, isooctyl $\alpha$-cyano-$\beta,\beta$-diphenylacrylate, methyl $\alpha$-carbomethoxy-cinnamate, methyl-$\alpha$-cyano-$\beta$-methyl-p-methoxy-cinnamate, butyl $\alpha$-cyano-$\beta$-methyl-p-methoxy-cinnamate, methyl-$\alpha$-carbomethoxy-p-methoxycinnamate and N-($\beta$-carbomethoxy-$\beta$-cyanovinyl)-2-methylindoline.

2.5. Nickel compounds, e.g. nickel complexes of 2,2'-thio-bis-[4-(1,1,3,3-tetra-methylbutyl)phenol], such as the 1:1 or 1:2 complex, with or without additional ligands such as n-butylamine, triethanolamine or N-cyclohexyldiethanolamine, nickel dibutyidithio-carbamate, nickel salts of the monoalkyl esters, e.g. the methyl or ethyl ester, of 4-hydroxy-3,5-di-tertbutylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Oxamides, e.g. 4,4'-dioctyloxyoxanilide, 2,2'-diethoxy-oxanilide, 2,2'-dioctyloxy-5,5'-di-tert-butoxanilide, 2,2'-didodecyloxy-5,5-di-tert-butoxanilide, 2-ethoxy-2'-ethyloxanilide, N,N'-bis(3-dimethyl-aminopropyl)-oxanilide, 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.7. 2-(2-Hydroxyphenyl)-1,3,5-triazines, e.g. 2,4,6-tris (2-hydroxy-4-octyloxyphenyl)-1,3,5-triazine, 2-(2-hydroxy-4-octyloxy-phenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis-(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-4-(dodecyloxy/tridecyloxy-2-hydroxypropoxy)-2-hydroxy-phenyl]-4,6-bis-(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris-[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-(2-hydroxy-4-[3-(2-ethylhexyl-1-oxy)-2-hydroxypropyloxy]phenyl)-4,6-bis(2,4-dimethylphenyl)-1,3,5-triazine.

3. Metal deactivators, e.g. N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene) oxalyl dihydrazide, oxanilide, isophthaloyl dihydrazide, sebacoyl bisphenyilydrazide, N,N'-diacetyladipoyl-dihydrazide, N,N'-bis-(salicyloyl)oxalyl dihydrazide, N,N'-bis-(salicyloyl)thiopropionyl dihydrazide.

4. Phosphites and phosphonites, e.g. triphenyl phosphite, diphenyl alkyl phosphites, phenyl dialkyl phosphites, tris (nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)-phosphite; bis(2,4-di-tert-butyl-phenyl)pentaerythritol diphosphite, bis-(2,6-di-tertbutyl-4-methylphenyl)-pentaerythritol-diphosphite, diisodecyl-oxypentaerythritol diphosphite, bis(2,4-di-tert-butyl-6-methylphenyl)-pentaerythritol diphosphite, bis(2,4,6-tris(tert-butylphenyl)-pentaerythritol diphosphite, tristearyl sorbitol triphosphite, bis(2,4-di-tert-butyl-6-methylphenyl)methyl phosphite, bis(2,4-di-tert butyl-6-methylphenyl)ethyl phosphite, 2,2',2"-nitrilo-[triethyltris(3,3',5,5'-tetra-tert-butyl-1,1'-biphenyl-2,2-diyl)phosphite], 2-ethylhexyl-(3,3',5,5'-tetra-tert-butyl-1,1'-biphenyl-2,2'-diyl)-phosphite, tetra-(2,4-di-tert-butylphenyl) 4,4'-biphenylene diphosphonite, 5. Hydroxylamines, e.g. N,N-dibenzylhydroxylamine, N,N-diethylhydroxylamine, N,N-dioctylhydroxylamine, N,N-dilaurylhydroxylamine, N,N-ditetradecylhydroxylamine, N,Ndihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, e.g. N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridecyl-nitrone, N-hexadecyl-alpha-pentadecyl-nitrone, N-octadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, e.g. dilauryl thiodipropionate or stearyl thiodipropionate.

8. Peroxide scavengers, e.g. esters of thiodipropionic acid: for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis-(β-dodecylmercapto)propionate.

9. Polyamide stabilisers, e.g. copper salts in combination with iodides and/or phosphorus compounds and salts of divalent manganese.

10. Basic co-stabilisers, e.g. melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zink pyrocatecholate.

11. Nucleating agents, e.g. inorganic substances such as talcum; metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as anionic copolymers.

12. Benzofuranones and indolinones, e.g. those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxy-ethoxy)phenyl]benzofuran-2-one, 3,3'-bis [5,7-di-tert-butyl-3-(4-[2-hydroxyethoxy]phenyl) benzofuran-2-one], 5,7-di-tert-butyl-3-(4-ethoxyphenyl) benzofuran-2-one, 3-(4-acetoxy-3,5-dimethylphenyl)-5,7-di-tert-butyl-benzofuran-2-one, 3-(3,5-dimethyl-4-pivaloyloxy-phenyl)-5,7-di-tert-butyl-benzofuran-2-one, 3-(2,3-dimethyl-phenyl)-5,7-di-tert-butyl-benzofuran-2-one; product known with the trade name Irganox HP 136 and Registry Number 181314-48-7.

13. Fillers and reinforcing agents, e.g. calcium carbonate, silicates, glass fibres, asbestos, talc, kaolin, mica, barium sulfate, metal oxides and hydroxides such as calcium and zinc oxides, titanium dioxide in the various forms, carbon black, graphite, wood flour and flours or fibers of other natural products, synthetic fibers.

14. Other additives, e.g. plasticisers, lubricants, emulsifiers, pigments, rheology additives, catalysts, flow-control agents, optical brighteners, flameproofing agents, antistatic agents and blowing agents.

The amount of compounds of formula (I) required for effective stabilisation of the polymer depends on a number of different factors, such as the type and characteristics of the polymer for which it is to be used, the intensity of the radiation, and the duration of the likely exposure.

A amount of 0.01 to 5% by weight of the polymer, preferably 0.1 to 1.0%, is usually sufficient.

The invention is illustrated in detail by the preparation and application examples below.

PREPARATION EXAMPLE

Preparation of the Compound of Formula (I) wherein m=2, n=3, x=2-6 (HALS 1)

0.1 Moles of cyanuryl chlorideare dissolved in 100 ml of toluene. 0.2 Moles of N-(2,2,6,6-tetramethyl-4-piperidinyl)-butylamine and 0.1 moles of sodium carbonate are added under stirring, heating to 80° C., keeping stirring and maintaining said temperature for 3 hours. The organic layer is then washed twice with 200 ml of distilled water to remove the salts.

0.1 Moles of 3-(2-aminoethylamine)propylamine, corresponding to an amine of general formula (II) with m=2 and n=3, are added to the toluene solution obtained, containing 0.1 moles of a compound of general formula (III), with R'=n-butyl and R"=2,2,6,6-tetramethyl-4-piperidine residue; acidity is neutralised with the equivalent amount of alkali, the solution is heated to reflux the water formed is distilled off. After completion of water distillation, the mixture is cooled to 90° C. and the organic layer is washed twice with 200 ml of distilled water.

The toluene layer, containing a substantially equimolecular mixture of compounds of general formula (VI), where m=2 and n=3, and (VI)', where m=3 and n=2, is reacted with 0.09 moles of 2,4-dichloro-6-N-(2,2,6,6-tetramethyl-4-piperidinyl)-butylamine, previously obtained by dripping 0.09 moles of N-(2,2,6,6-tetramethyl-4-piperidinyl)-butylamine at the temperature of 15-20° C. into 0.09 moles of cyanuryl chloride dissolved in 100 ml of toluene, followed by neutralisation with the equivalent amount of alkali by refluxing for 5 hours in the presence of 0.2 moles of sodium carbonate, and distilling off the reaction water.

After completion of the reaction the mixture is cooled to 80° C. and washed twice with 200 ml of distilled water.

After filtration of any insolubles, the solvent of resulting solution is distilled off under vacuum, to obtain 84 grams of a mixture of oligomers of general formula (I) wherein indexes m and n have the values 2 and 3.

In the following application examples, the codes Hals 2-8 refer to compounds having the following formulas:

HALS 2: compound of formula (A) wherein R=

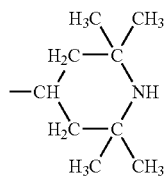

$R_1$ = n-butyl n=2-5;

HALS 3: compound of formula (B) wherein $R_1$=H, $R_2$=CH$_2$—CH$_2$, n=10-15;

HALS 4: compound of formula (C) wherein R=H, X=residue of formula VIII, p=6, n=2-10;

HALS 5: compound of formula (C) wherein R=H, X=residue of formula IX, p=6, n=2-10;

HALS 6: compound of formula (D) wherein R=H, n=8;

HALS 7: compound of formula (E) wherein groups $R_1$ and $R_2$ of substituent R represent the n-butyl chain and the radical respectively of formula (V) having R'''=methyl;

HALS 8: compound of formula (F) wherein groups $R_1$ and $R_2$ of substituent R represent the n-butyl chain and the residue of formula (V) having R'''=H;

All amounts are expressed in weight unless otherwise stated.

Application Example 1

Light Stabilisation of Polypropylene Fibre 1000 parts of unstabilised polypropylene homopolymer powder (fluidity index: approx. 23 g/'10' at 230° C.-2.16 kP) is mixed in a laboratory mixer with 0.75 parts of calcium stearate, 0.50 parts of tris-(2,4-of-ter-butyl-phenyl)phosphite, 0.50 parts of 1,3,5-tris-(3,5-di-ter-butyl-4-hydroxybenzyl)isocyanurate and 3 parts of HALS stabiliser as shown in Tables 1A and 1B below.

The dry mixture is extruded in a laboratory extruder at 230° C. and granulated.

The granulate is transformed into multifilament yarn by spinning with a laboratory extruder at a maximum temperature of 260° C., to obtain a multifilament yarn with a titre of 480/60 dtex.

The yarn is exposed in a WOM according to ISO 4892. The light resistance of the yarn is monitored by periodic sampling; the modulus of elasticity of the samples is tested with a UTS test.

The parameter used to compare the light resistance of the samples is $t_{50}$, defined as "time of exposure in WOM, expressed in hours, at a UTS amounting to 50% of the initial value".

The experimental results obtained are summarised in tables 1 A and 1 B

TABLE 1 A

Light stability of multifilament yarn PP 480/60 dtex

| Type of stabiliser | $t_{50}$ hours |
| --- | --- |
| Without light stabilisation | 300 |
| 0.30% HALS 1 | 1430 |

TABLE 1 A-continued

Light stability of multifilament yarn PP 480/60 dtex

| Type of stabiliser | $t_{50}$ hours |
| --- | --- |
| 0.30% HALS 2 | 1400 |
| 0.30% HALS 3 | 1350 |
| 0.30% HALS 5 | 1380 |
| 0.30% HALS 6 | 1290 |

TABLE 1 B

Light stability of multifilament yarn PP 480/60 dtex

| Type of stabiliser | $t_{50}$ hours |
| --- | --- |
| 0.3% of a 50:50 mixture of HALS 1/HALS/2 | 1470 |
| 0.3% of a 30:70 mixture of HALS 1/HALS/2 | 1510 |
| 0.3% of a 30:70 mixture of HALS 1/HALS/3 | 1490 |
| 0.3% of a 25:25:50 mixture of HALS 1/HALS/2 HALS 3 | 1520 |
| 0.3% of a 50:50 mixture of HALS 1/HALS/6 | 1480 |
| 0.3% of a 50:50 mixture of HALS 1/HALS/5 | 1520 |

Application Example 2

Light Stabilisation of High-Density Polyethylene Raffia 1000 parts of unstabilised high-density polyethylene (fluidity index: approx. 2 g/'10' at 190° C.-2.16 kP) are mixed in a laboratory mixer with 0.30 parts of 1,3,5-tris-(3,5-di-ter-butyl-4-hydroxybenzyl)isocyanurate and 1 part of HALS stabiliser as shown in Tables 2A and 2B below.

The dry mixture is extruded in a laboratory extruder at 230° C. and granulated.

The granulate is then transformed into raffia (thickness 50 μm) by extrusion at a maximum temperature of 230° C. and 1:5 stretching in a specific plant.

The raffia is exposed in a WOM according to ISO 4892. The light resistance of the raffia is monitored by periodic sampling; the modulus of elasticity of the samples is tested with a UTS test.

The parameter used to compare the light resistance of the samples is $t_{50}$, defined as "time of exposure in WOM, expressed in hours, at a UTS amounting to 50% of the initial value".

The experimental results obtained are summarised in tables 2 A and 2 B.

TABLE 2 A

Light stability of HDPE raffia with a thickness of 50 μm

| Stabilisation | $t_{50}$ hours WOM |
| --- | --- |
| Without light stabilisation | 510 |
| 0.10% HALS 1 | 3050 |
| 0.10% HALS 2 | 3000 |
| 0.10% HALS 3 | 2870 |
| 0.10% HALS 4 | 2790 |
| 0.10% HALS 5 | 2850 |
| 0.10% HALS 7 | 2920 |
| 0.10% HALS 8 | 2750 |

TABLE 2 B

Light stability of HDPE raffia with a thickness of 50 μm

| Stabilisation | $t_{50}$ hours WOM |
|---|---|
| 0.10% of a 70:30 mixture of HALS 1/HALS 2 | 3250 |
| 0.10% of a 50:50 mixture of HALS 1/HALS 4 | 3150 |
| 0.10% of a 60:40 mixture of HALS 1/HALS 7 | 3300 |
| 0.10% of a 30:30:40 mixture of HALS 1/HALS/2 HALS 3 | 3430 |
| 0.10% of a 50:50 mixture of HALS 1/HALS 8 | 3220 |
| 0.10% of a 50:50 mixture of HALS 1/HALS 5 | 3300 |

Application Example 3

Light Stabilisation of LDPE Film 1000 parts of unstabilised low-density polyethylene (fluidity index: approx. 0.60 g/'10' at 190° C.-2.16 kP) are mixed in a laboratory mixer with 0.30 parts of n-octadecyl-3-(3',5'-di-ter-butyl-4-hydroxyphenyl)-propionate and 1.50 parts of HALS stabiliser as shown in Tables 3A and 3B below.

The dry mixture is extruded in a laboratory extruder at 230° C. and granulated.

The granulate is then transformed into film with a final thickness of approx. 150 μm by extrusion and bubble film making with a laboratory extruder fitted with a rotary head, at a maximum temperature of 230° C.

Specimens taken from said film are mounted on supports and exposed in a WOM according to ISO 4892.

The light resistance of the product is monitored by periodic sampling; the carbonyl index of the samples is tested with FT-IR measurements.

The parameter used to compare the light resistance of the samples is $t_0$, defined as "time of exposure in WOM, expressed in hours, required for the carbonyl index to increase to the value of 0.10".

The experimental results obtained are summarised in tables 3 A and 3 B.

TABLE 3 A

Light stability of LDPE blown film at a thickness of 150 μm

| Stabilisation | $t_{0.10}$ hours WOM |
|---|---|
| Without light stabilisation | 250 |
| 0.15% HALS 1 | 4200 |
| 0.15% HALS 2 | 4050 |
| 0.15% HALS 3 | 4100 |
| 0.15% HALS 4 | 3920 |
| 0.15% HALS 5 | 3900 |
| 0.15% HALS 7 | 3950 |

TABLE 3 B

Light stability of LDPE blown film at a thickness of 150 μm

| Stabilisation | $t_{0.10}$ hours WOM |
|---|---|
| Without light stabilisation | 250 |
| 0.15% HALS 1 | 4200 |
| 0.15% of a 70:30 mixture of HALS 1/HALS 2 | 4350 |
| 0.15% of a 30:70 mixture of HALS 1/HALS 2 | 4370 |
| 0.15% of a 10:40:50 mixture of HALS 1/HALS 2 HALS 3 | 4400 |
| 0.15% of a 40:40:20 mixture of HALS 1/HALS 3 HALS 4 | 4350 |
| 0.15% of a 30:40:30 mixture of HALS 1/HALS 3 HALS 7 | 4300 |
| 0.15% of a 30:40:30 mixture of HALS 1/HALS 3 HALS 5 | 4350 |

The invention claimed is:

1. A light stabilisation mixture containing 10% to 90% by weight of oligomers of formula (I)

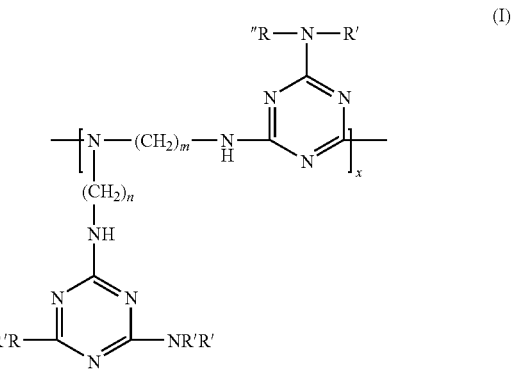

wherein:

x is between 2 and 10 m and n, each independent from each other, are 2 to 8 and have different values in the individual monomer units constituting the light stabilisation mixture, R' and R", which are the same or different, are straight or branched $C_2$-$C_8$ alkyl groups, or a group of formula (V)

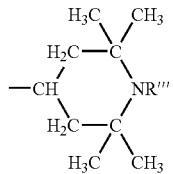

wherein R'''=H or a straight or branched $C_1$-$C_4$ alkyl group and at least one group of formula A, B, C, D, E or F;

(A)

formula A

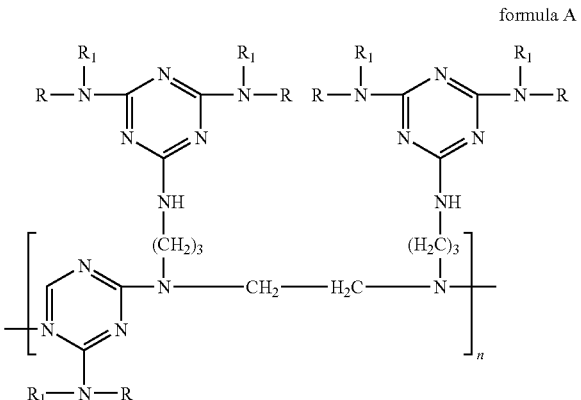

wherein:

R is:

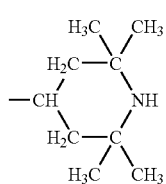

or:

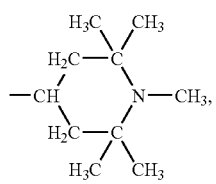

$R_1$ is H or a straight or branched $C_1$-$C_4$ alkyl, and
n is 2 to 10;

(B)

formula B

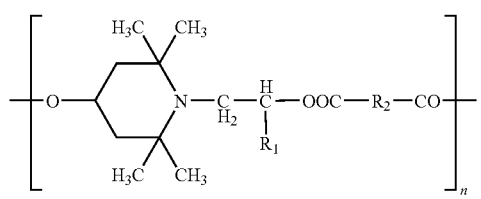

wherein:
$R_1$ is hydrogen or methyl,
$R_2$ is a direct bond or a $C_1$-$C_{10}$ alkylene group, and
n is between 2 and 50;

(C)

formula C

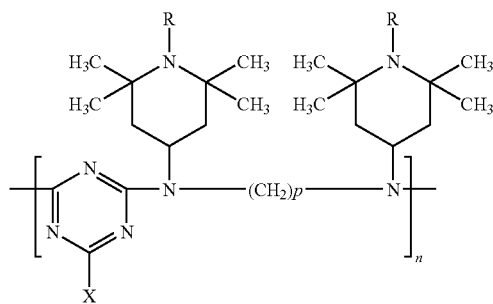

wherein:
n is between 2 and 50,
p is between 2 and 10,
R is H or methyl
and X is a group of formula VII, VIII or IX:

Formula VII

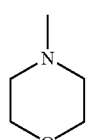

Formula VIII

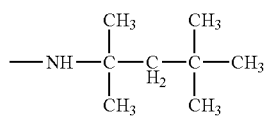

Formula IX

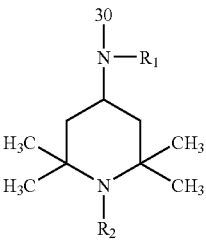

wherein $R_1$ is a $C_1$-$C_4$ straight or branched alkyl radical and
$R_2$ is H or methyl;

(D)

Formula D

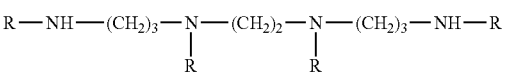

wherein:
n is between 2 and 10, and
R is H or methyl;

(E)

Formula E $$R-NH-(CH_2)_3-N-(CH_2)_2-N-(CH_2)_3-NH-R$$
$$\phantom{R-NH-(CH_2)_3-}R\phantom{-(CH_2)_2-}R$$

wherein:
R is

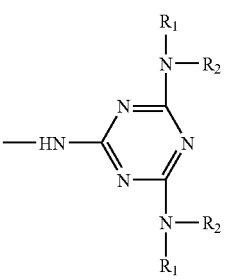

wherein $R_1$ and $R_2$ are independently H, a straight or
branched $C_1$-$C_4$ alkyl group or a group of formula (V)

(V)

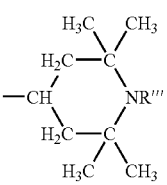

wherein R''' is H or a straight or branched $C_1$-$C_4$ alkyl;

(F)

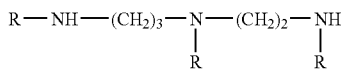
Formula F wherein R is the same as defined above for Formula E.

2. The light stabilisation mixture as claimed in claim 1, wherein in the compound of general formula (I):
m=2 and n=3
or
m=3 and n=2,
R'=n-butyl, and
R"=group of formula (V) wherein R'"=H or methyl.

3. The light stabilisation mixture as claimed in claim 1, wherein in the compound of general formula A:
n=2-5
$R_1$=n-butyl, and
R

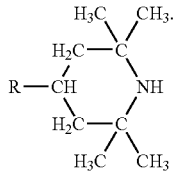

4. The light stabilisation mixture as claimed in claim 1, wherein in the compound of general formula B:
$R_1$=H
$R_2$=a $C_2$ alkylene chain, and
n=10-15.

5. The light stabilisation mixture as claimed in claim 1, wherein in the compound of general formula C:
R=H,
X=residue of formula VIII or IX,
p=6, and
n=2-10.

6. The light stabilisation mixture as claimed in claim 1, wherein in the compound of general formula D:
R=H and
n=8.

7. The light stabilisation mixture as claimed in claim 1, wherein in the compound of general formula E:
$R_1$=n-butyl and $R_2$=residue of formula (V) wherein R'"=methyl.

8. The light stabilisation mixture as claimed in claim 1, wherein in the compound of general formula F:
$R_1$=n-butyl and $R_2$=residue of formula (V) wherein R'"=methyl.

9. A composition comprising an organic material subject to breakdown caused by light, and the light stabilisation mixture as claimed in claim 1.

10. The composition as claimed in claim 9, wherein the organic material is a synthetic polymer.

11. The composition as claimed in claim 9, wherein the organic material is a polyolefin.

12. The composition as claimed in claim 9, wherein the organic material is polyethylene, polypropylene, a polyethylene copolymer, or a polypropylene copolymer.

13. A method for stabilising an organic material subject to breakdown caused by light, comprising the addition to the organic material of the light stabilisation mixture as claimed in claim 1.

* * * * *